US012675544B2

(12) United States Patent
Tamayo

(10) Patent No.: US 12,675,544 B2
(45) Date of Patent: Jul. 7, 2026

(54) MODIFYING WEBSITE ELEMENT STYLES BASED ON USER INTERACTION

(71) Applicant: Capital One Services, LLC, McLean, VA (US)

(72) Inventor: Bryan Tamayo, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/346,522

(22) Filed: Jul. 3, 2023

(65) Prior Publication Data

US 2025/0013710 A1     Jan. 9, 2025

(51) Int. Cl.
| *G06F 16/958* | (2019.01) |
| *G06F 40/103* | (2020.01) |
| *G06F 40/143* | (2020.01) |
| *G06N 20/00* | (2019.01) |

(52) U.S. Cl.
CPC .......... *G06F 16/986* (2019.01); *G06F 40/103* (2020.01); *G06F 40/143* (2020.01); *G06N 20/00* (2019.01)

(58) Field of Classification Search
CPC .... G06F 16/986; G06F 40/143; G06F 40/103; G06N 20/00
See application file for complete search history.

(56) References Cited

U.S. PATENT DOCUMENTS

| 6,589,291 B1 * | 7/2003 | Boag | G06F 40/143 |
| | | | 707/E17.121 |
| 7,594,166 B1 * | 9/2009 | Ramakrishna | G06F 16/958 |
| | | | 715/236 |

| 8,543,668 B1 * | 9/2013 | Long | G06F 16/951 |
| | | | 709/219 |
| 9,063,726 B1 * | 6/2015 | Stepanov | G06F 8/315 |
| 10,083,159 B1 * | 9/2018 | Bekmambetov | G06F 3/0481 |
| 10,303,760 B2 * | 5/2019 | Levi | G06F 40/194 |
| 11,803,701 B2 * | 10/2023 | Sahagun | G06F 40/186 |
| 2005/0091111 A1 * | 4/2005 | Green | G06Q 30/02 |
| | | | 705/14.59 |
| 2008/0288476 A1 * | 11/2008 | Kim | G06F 16/9577 |

(Continued)

FOREIGN PATENT DOCUMENTS

WO     WO-2015160351 A1 * 10/2015     ........... G06F 40/205

OTHER PUBLICATIONS

Infinite Scroll, "Events" (4 pages), retrieved from https://infinite-scroll.com/events.html.

*Primary Examiner* — Chau T Nguyen
(74) *Attorney, Agent, or Firm* — Harrity & Harrity, LLP

(57) ABSTRACT

In some implementations, a style engine may receive, using a first code snippet included in a website, an indication of a first user action. The style engine may transmit an instruction to modify a first style, associated with a first element on the website, based on the indication of the first user action. The instruction to modify the first style may be omitted from code comprising the website. The style engine may receive, using a second code snippet included in the website, an indication of a second user action. The style engine may transmit an instruction to modify a second style, associated with a second element on the website, based on the indication of the second user action. The instruction to modify the second style may be omitted from the code comprising the website.

20 Claims, 13 Drawing Sheets

(56) References Cited

U.S. PATENT DOCUMENTS

| | | | | |
|---|---|---|---|---|
| 2010/0131835 A1* | 5/2010 | Kumar | G06Q 30/0269 | 715/205 |
| 2012/0240019 A1* | 9/2012 | Nuzzi | G06F 16/24575 | 715/205 |
| 2013/0212461 A1* | 8/2013 | Sarangapani | G06F 11/3616 | 715/234 |
| 2014/0053059 A1* | 2/2014 | Weber | G06F 40/10 | 715/234 |
| 2014/0369485 A1* | 12/2014 | Hollander | H04M 3/5166 | 379/265.02 |
| 2015/0161084 A1* | 6/2015 | Long | G06F 16/951 | 715/205 |
| 2016/0092818 A1* | 3/2016 | Kamath | G06Q 10/06316 | 705/7.26 |
| 2016/0239880 A1* | 8/2016 | Blanchfield | G06F 40/143 | |
| 2016/0292283 A1* | 10/2016 | Vishwanath | G06F 16/9535 | |
| 2017/0097927 A1* | 4/2017 | Levi | G06F 40/221 | |
| 2017/0154366 A1 | 6/2017 | Turgeman | | |
| 2017/0185596 A1 | 6/2017 | Spirer | | |
| 2021/0352359 A1* | 11/2021 | Barvo | H04N 21/2187 | |
| 2022/0269935 A1* | 8/2022 | Arivazhagan | G06N 3/08 | |
| 2023/0281381 A1* | 9/2023 | Sahagun | G06V 10/774 | |

* cited by examiner

600

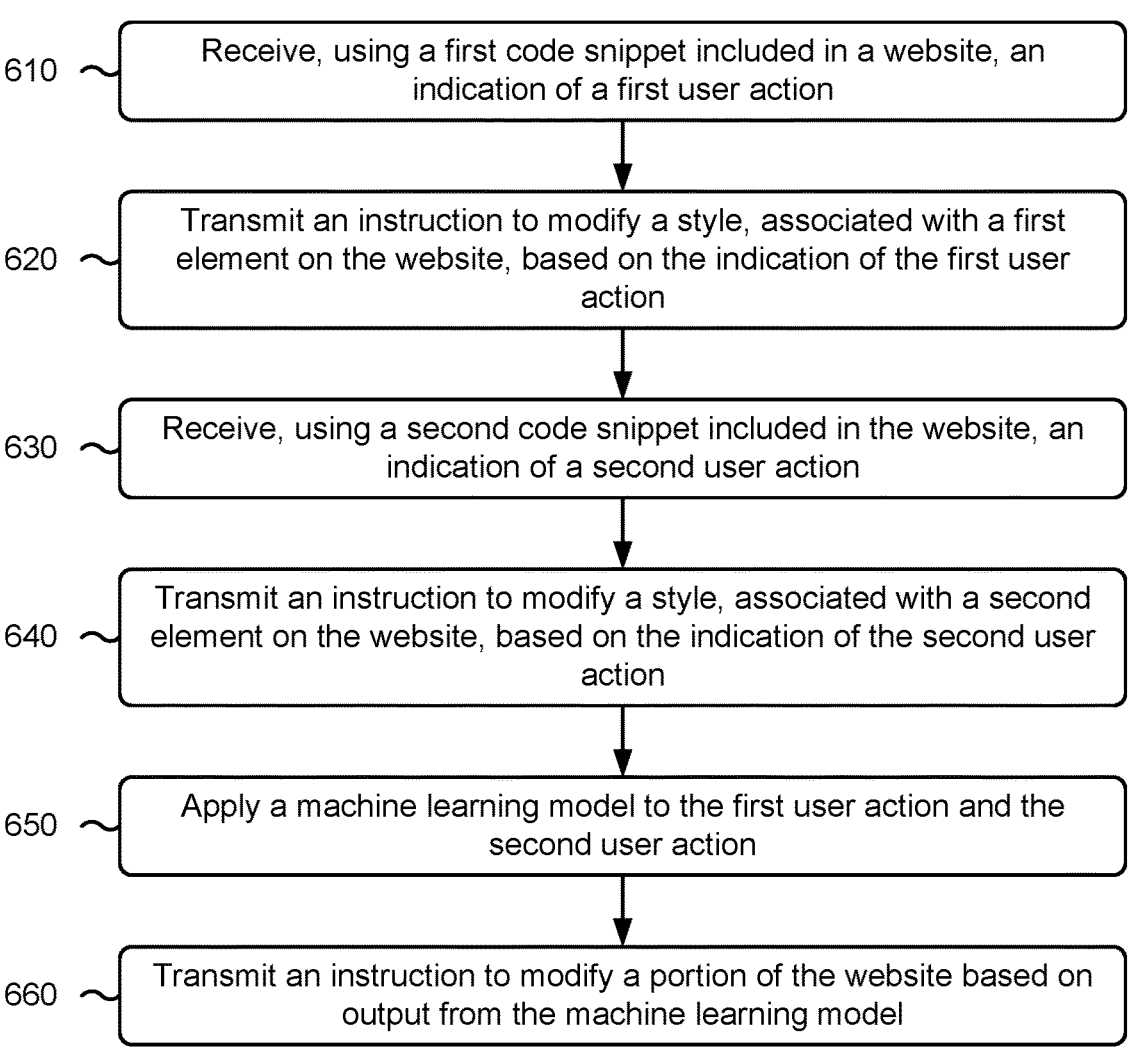

610 — Receive, using a first code snippet included in a website, an indication of a first user action 620 — Transmit an instruction to modify a style, associated with a first element on the website, based on the indication of the first user action 630 — Receive, using a second code snippet included in the website, an indication of a second user action 640 — Transmit an instruction to modify a style, associated with a second element on the website, based on the indication of the second user action 650 — Apply a machine learning model to the first user action and the second user action 660 — Transmit an instruction to modify a portion of the website based on output from the machine learning model

FIG. 6

MODIFYING WEBSITE ELEMENT STYLES BASED ON USER INTERACTION

BACKGROUND

Website styles include how elements of the website look, such as bolding, italics, or underlining for text, colors or textures for buttons, or captioning for images, among other examples. Generally, website styles are static or are selected based on properties of a device used to access the website (e.g., whether the device is a mobile device or a desktop device).

SUMMARY

Some implementations described herein relate to a system for automatically modifying website element styles. The system may include one or more memories and one or more processors communicatively coupled to the one or more memories. The one or more processors may be configured to receive, using a first code snippet included in a website, an indication of a first user action. The one or more processors may be configured to transmit an instruction to modify a style, associated with a first element on the website, based on the indication of the first user action. The one or more processors may be configured to receive, using a second code snippet included in the website, an indication of a second user action. The one or more processors may be configured to transmit an instruction to modify a style, associated with a second element on the website, based on the indication of the second user action. The one or more processors may be configured to apply a machine learning model to the first user action and the second user action. The one or more processors may be configured to transmit an instruction to modify a portion of the website based on output from the machine learning model.

Some implementations described herein relate to a method of automatically modifying website element styles. The method may include receiving, using a first code snippet included in a website, an indication of a first user action. The method may include transmitting an instruction to modify a first style, associated with a first element on the website, based on the indication of the first user action, wherein the instruction to modify the first style is omitted from code comprising the website. The method may include receiving, using a second code snippet included in the website, an indication of a second user action. The method may include transmitting an instruction to modify a second style, associated with a second element on the website, based on the indication of the second user action, wherein the instruction to modify the second style is omitted from the code comprising the website.

Some implementations described herein relate to a non-transitory computer-readable medium that stores a set of instructions for automatically modifying website element styles. The set of instructions, when executed by one or more processors of a device, may cause the device to receive, using a first code snippet included in a website, an indication of a first user action. The set of instructions, when executed by one or more processors of the device, may cause the device to receive, using a second code snippet included in the website, an indication of a second user action. The set of instructions, when executed by one or more processors of the device, may cause the device to apply a machine learning model to the first user action and the second user action in order to generate a recommended modification to associate with a third user action. The set of instructions, when executed by one or more processors of the device, may cause the device to receive, using a third code snippet included in the website, an indication of the third user action. The set of instructions, when executed by one or more processors of the device, may cause the device to transmit an instruction to perform the recommended modification to the website based on the indication of the third user action.

BRIEF DESCRIPTION OF THE DRAWINGS

FIG. 6 is a flowchart of an example process relating to modifying website element styles based on user interaction, in accordance with some embodiments of the present disclosure.

DETAILED DESCRIPTION

Figure 1A:
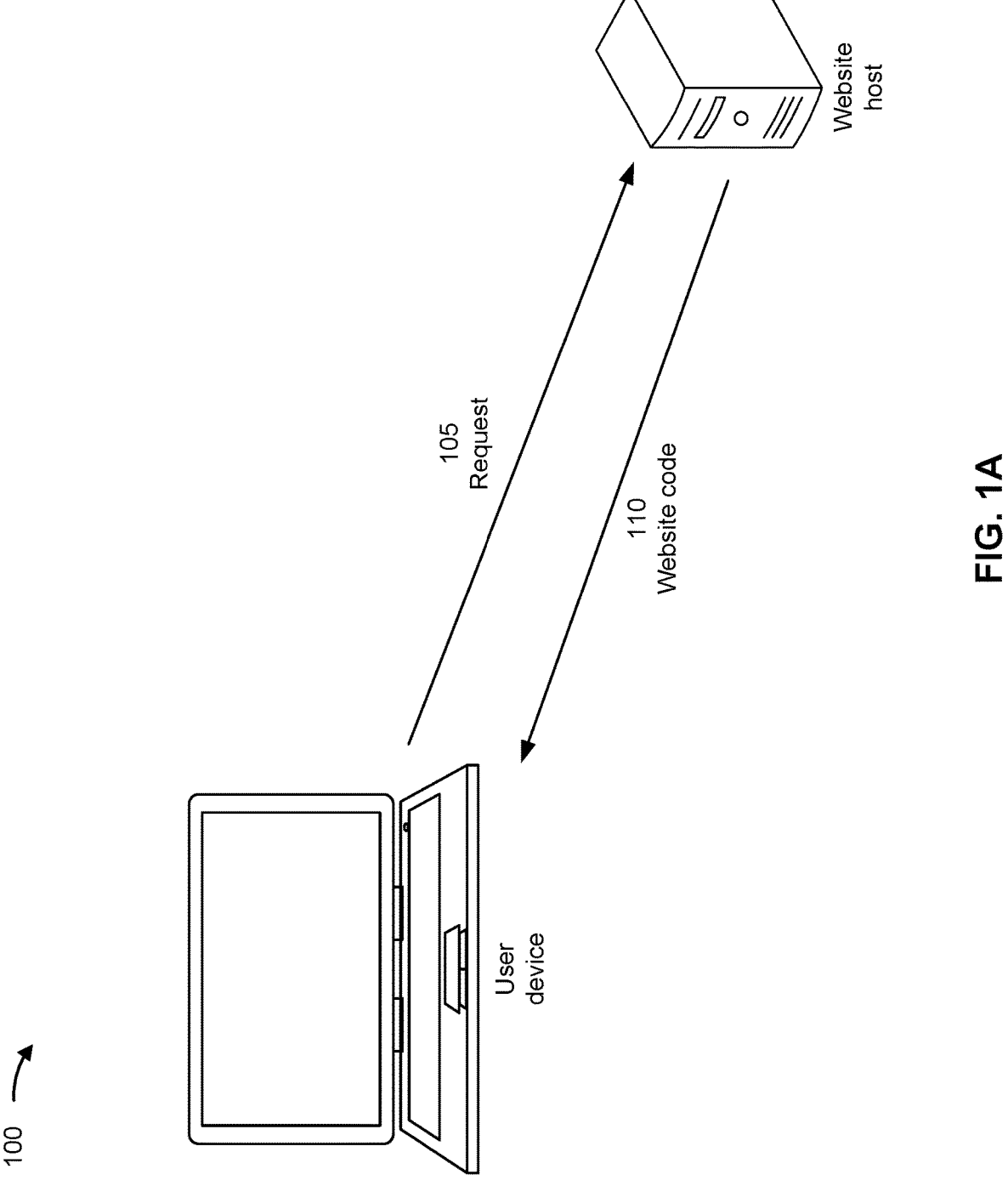
FIGS. 1A-1E are diagrams of an example implementation relating to modifying website element styles based on user interaction, in accordance with some embodiments of the present disclosure.

The following detailed description of example implementations refers to the accompanying drawings. The same reference numbers in different drawings may identify the same or similar elements.

Website styles include how elements of the website look, such as bolding, italics, or underlining for text, colors or textures for buttons, or captioning for images, among other examples. Website styles are generally hard-coded into hypertext markup language (HTML) and/or cascading style sheets (CSS) included in code of the website. Accordingly, website styles consume network overhead because the website styles increase a size of the code of the website that is transmitted from a website host to a user device accessing the website. Additionally, the website host consumes processing resources and power in transmitting the code, and the user device consumes processing resources and power in receiving the code (as well as memory overhead in caching or otherwise storing the code).

Some website elements may be interactive. A script (e.g., a JavaScript® file) may include code that modifies a style of a website element in response to user interaction. For example, the script may modify a style of a button in response to a click on the button. Style modifications are generally hard-coded into scripts that are included in, or referenced by, HTML included in code of the website. Accordingly, style modifications consume network overhead because the style modifications increase a size of the code of the website that is transmitted from a website host to a user device accessing the website. Additionally, the website host consumes processing resources and power in transmitting the code, and the user device consumes processing resources and power in receiving the code (as well as memory overhead in caching or otherwise storing the code). Furthermore, because the style modifications are hard-coded, the code of the website has to be updated each time a new style modification is added or an old style modification is replaced. Every update of the code of the website consumes power and processing resources at the website host.

Some implementations described herein enable code snippets, included in code of a website, to indicate user actions with the website. Accordingly, a style engine (e.g., remote from the user device) may receive indications of the user actions (e.g., using application programming interfaces (APIs)) and transmit instructions to modify styles of the website in response. The instructions from the style engine are omitted from the code of the website. As a result, network overhead is conserved as compared with when style modifications are hard-coded into the code of the website. Additionally, both a website host for the website and a user device accessing the website conserve power and processing resources because the code of the website is smaller as compared with when style modifications are hard-coded into the code of the website. Furthermore, the style engine may incorporate machine learning to adapt new style modifications and/or replace old style modifications without updating the code of the website. As a result, power and processing resources are conserved that otherwise would have been expended on updating the code of the website at the website host.

FIGS. 1A-1E are diagrams of an example 100 associated with modifying website element styles based on user interaction. As shown in FIGS. 1A-1E, example 100 includes a user device, a website host, and a style engine. These devices are described in more detail in connection with FIGS. 4 and 5.

As shown in FIG. 1A and by reference number 105, the user device may transmit, and the website host may receive, a request for a website. The request may be a hypertext transfer protocol (HTTP) request. The request may include an indication of the website. For example, the request may include a uniform resource locator (URL) and/or an Internet protocol (IP) address, among other examples.

In some implementations, a user of the user device may provide input (e.g., using an input component, such as a mouse, a keyboard, a touchscreen, and/or a microphone) in response to a user interface (UI) (e.g., output to the user using a display, a speaker, and/or another type of output component) generated by a web browser (or another type of application) executed by the user device. The input from the user may trigger the user device to transmit the request to the website host. In some implementations, the input from the user may indicate the website. For example, the user may enter a URL and/or an IP address associated with the website. In some implementations, the user device may use a domain name service (DNS) to determine the IP address based on the URL.

As shown by reference number 110, the website host may transmit, and the user device may receive, code comprising the website. The website host may transmit the code in response to the request from the user device. In some implementations, the code is included in an HTTP response.

Figure 1B:
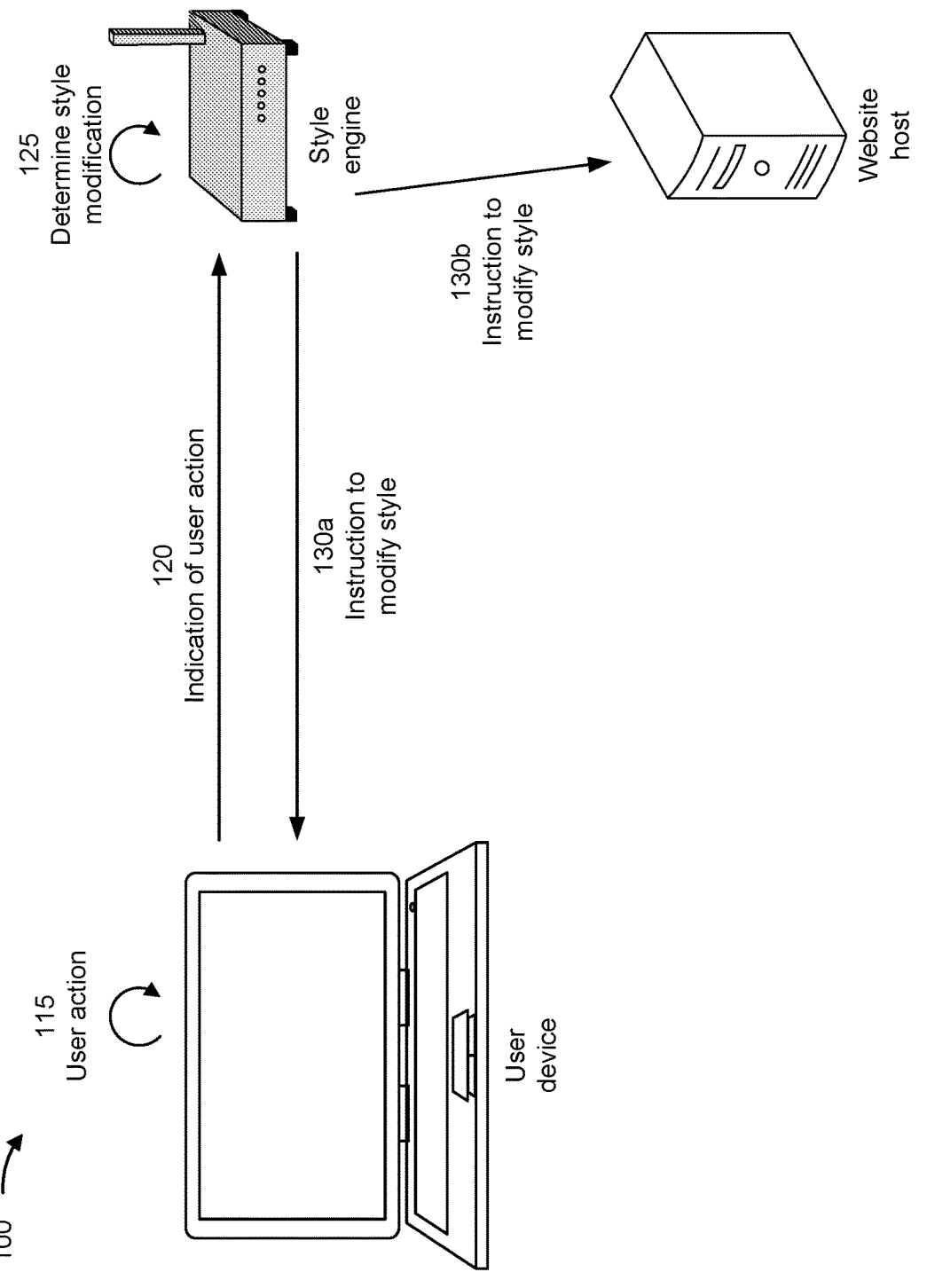

As shown in FIG. 1B and by reference number 115, the user of the user device may perform a first user action. For example, as described in connection with FIGS. 2A-2C, the first user action may include scrolling. Other examples of user actions include hovering over an element of the website, left-clicking on an element of the website, right-clicking on an element of the website, tapping on an element of the website, or double clicking or double tapping on an element of the website. More complex user actions may include leaving the website and returning at a later time or leaving the website open in an inactive tab of a web browser, among other examples.

As shown by reference number 120, the user device may transmit, and the style engine may receive, an indication of the first user action. The style engine may receive the indication of the first user action using a first code snippet included in the website. For example, the first code snippet may include executable code that calls an API function to report user actions. Accordingly, the indication of the first user action may be an argument (e.g., at least one argument) in a call to the API function. The code comprising the website therefore includes an indication of the API function (e.g., an IP address or another type of endpoint associated with the API function, a name of the API functions, and/or an indication of an argument accepted by the API function, among other examples). Because the indication of the first user action may be transmitted directly to the style engine, power, processing resources, and network overhead are conserved that otherwise would have been consumed in transmitting the indication through multiple parties.

In some implementations, the first code snippet is included in an HTML file of the website. Alternatively, the first code snippet may be included in a script (e.g., a JavaScript file), and an HTML file of the website may link to the script. Code snippets described herein may also be referred to as a "stems."

Although the example 100 is described in connection with the user device transmitting the indication of the first user action directly to the style engine, other examples may include the user device transmitting the indication of the first user action to the website host, and the website host transmitting the indication of the first user action to the style engine (e.g., forwarding the indication to the style engine or re-packaging the indication into a new message that is transmitted to the style engine). As a result, the API function indicated by the first code snippet may be associated with the website host, which is less likely to trigger a security alert from the user device (e.g., from a web browser and/or an anti-malware application executed by the user device) as compared with the API function being associated with the style engine.

Figure 2A:
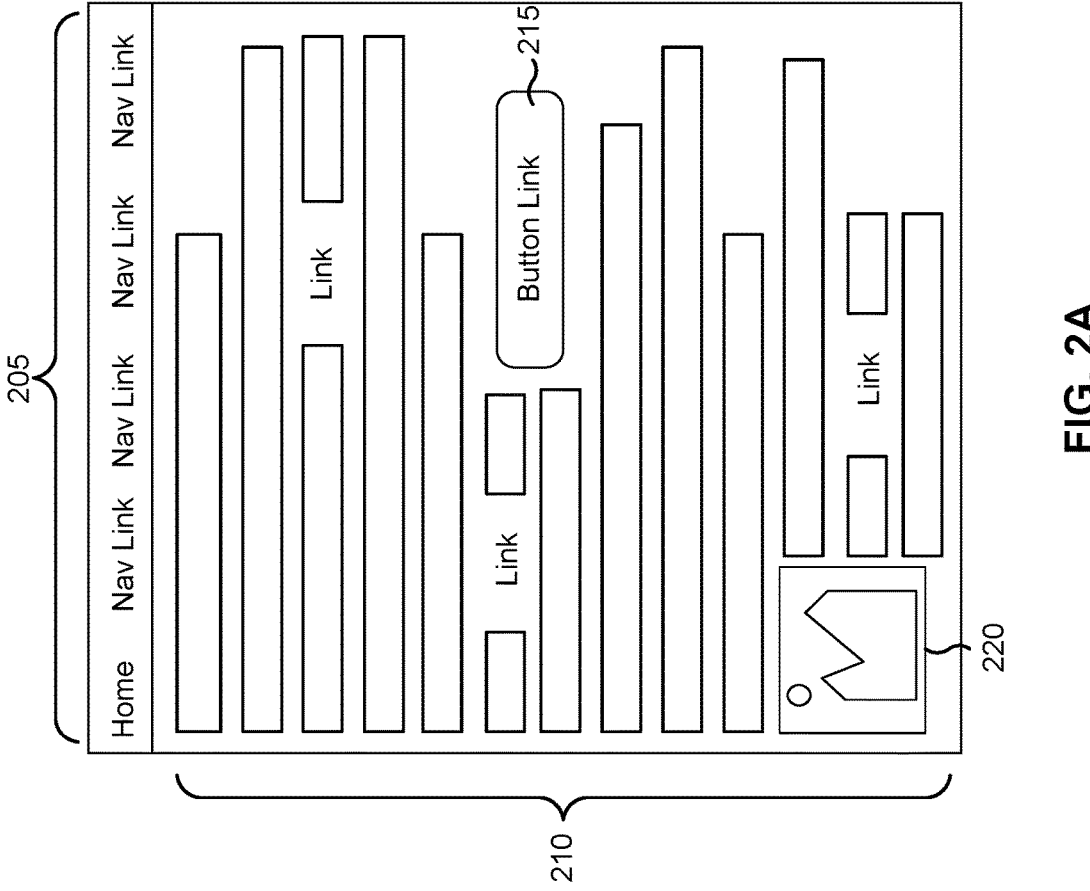
FIGS. 2A-2C are diagrams of an example sequence of website element style changes, in accordance with some embodiments of the present disclosure.
Figure 2B:
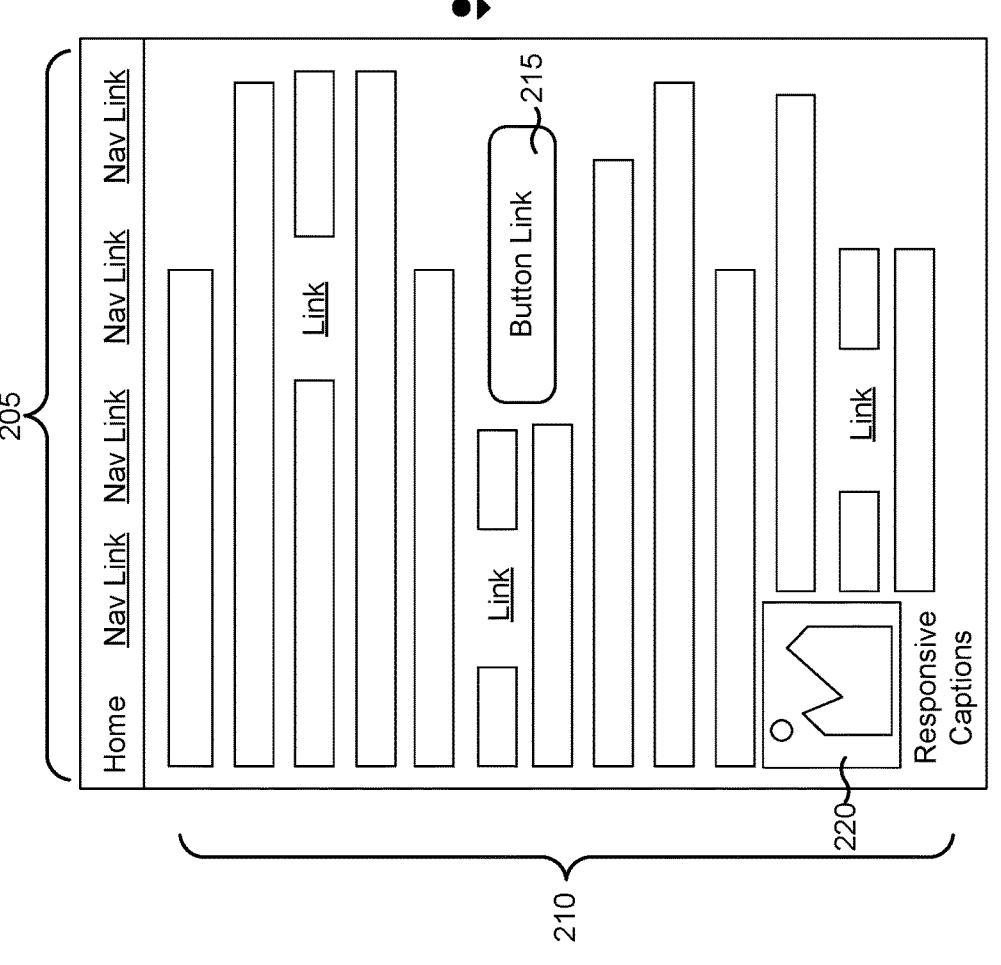
Figure 2C:
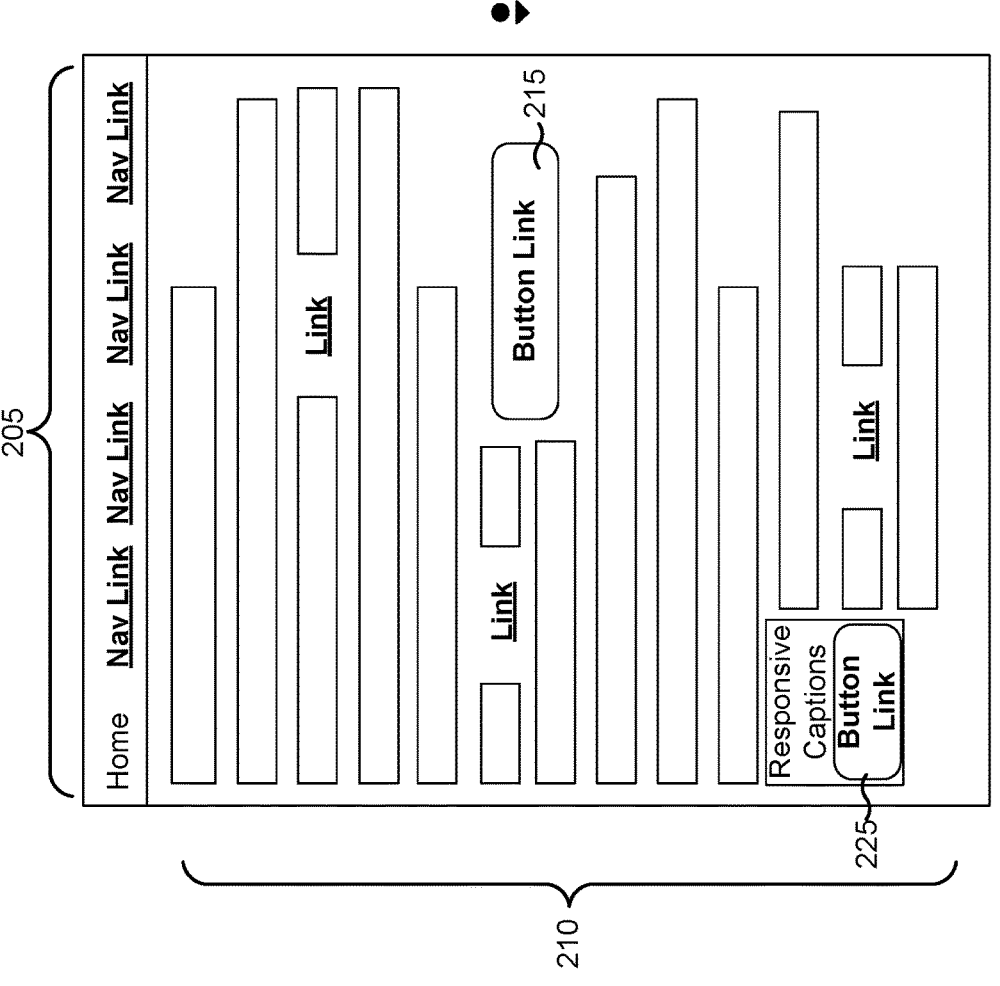

As shown by reference number 125, the style engine may determine an instruction to modify a first style, associated with a first element on the website, based on the indication of the first user action. For example, the instruction may include an indication of a new CSS selector (associated with the first element) to replace an old CSS selector (associated with the first element). As shown in FIGS. 2A-2C, the first element may include a hyperlink, a button, and/or an image. Other examples of elements on the website include text boxes, radio buttons, checkboxes, drop-down menus, text, or banner ads.

In some implementations, the style engine may map the indication of the first user action to the instruction to modify the first style using a data structure. For example, the data structure may include a table (or another type of relational data structure) that associates user actions with instructions to modify styles. The data structure may be stored locally (e.g., in a memory controlled by the style engine) or at least partially remotely from the style engine (e.g., physically, logically, and/or virtually). Accordingly, the style engine may transmit a query (e.g., an HTTP request and/or an API call including an indication of the first user action) to a device storing the data structure, and the style engine receive a response (e.g., an HTTP response and/or a return from the API call) indicating the instruction to modify the first style.

Because the instruction to modify the first style is omitted from the code comprising the website, the website host consumed less power, fewer processing resources, and less network overhead in transmitting the code to the user device. Additionally, the user device consumed less power, less memory overhead in storing the code (e.g., temporarily for a web browser), and fewer processing resources in receiving the code from the website host (e.g., re-assembling packets from the website host).

As shown by reference number 130a, the style engine may transmit, and the user device may receive, the instruction to modify the first style. For example, the style engine may transmit the instruction in response to an API call from the user device triggered by the first code snippet. Accordingly, the user device may change how the website is output to the user consistent with the instruction to modify the first style. For example, a web browser executed by the user device may modify the first style in response to the instruction. As described in connection with FIGS. 2A-2C, the modification may affect how the first element on the website looks. Additionally, or alternatively, for a visually impaired user, the modification may affect how the first element is described or narrated to the user. Because the instruction may be transmitted directly to the user device, power, processing resources, and network overhead are conserved that otherwise would have been consumed in transmitting the instruction through multiple parties.

Additionally, or alternatively, and as shown by reference number 130b, the style engine may transmit, and the website host may receive, the instruction to modify the first style. For example, the style engine may transmit the instruction to the website host in response to the indication of the first user action. Accordingly, the website host may transmit, and the user device may receive, an update to the code comprising the website based on the instruction to modify the first style. As a result, the first style is changed in response to a communication from the website host, which is less likely to trigger a security alert from the user device (e.g., from a web browser and/or an anti-malware application executed by the user device) as compared with the user device receiving a communication directly from the style engine.

Figure 1C:
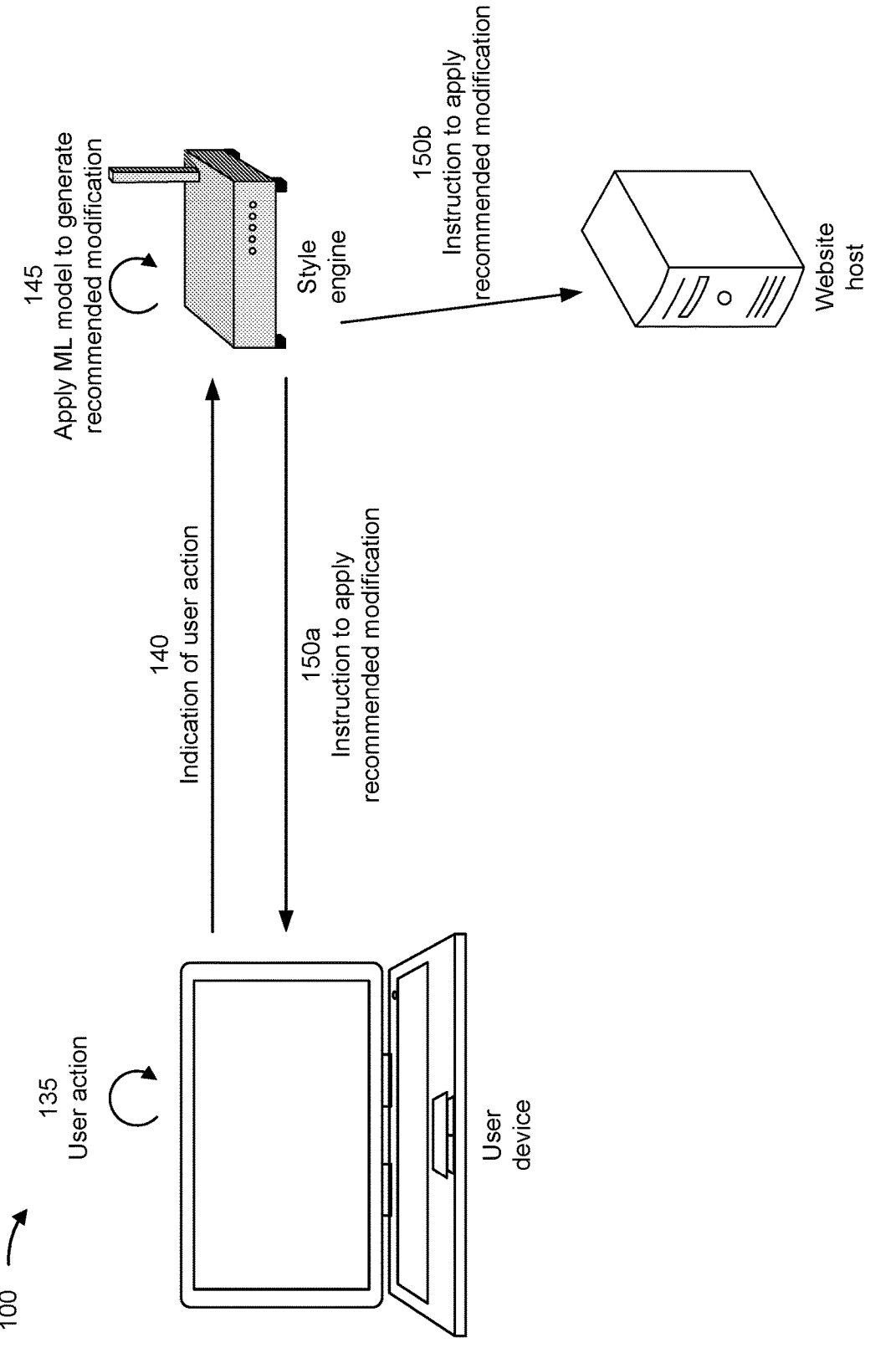

As shown in FIG. 1C and by reference number 135, the user of the user device may perform a second user action. As shown by reference number 140, the user device may transmit, and the style engine may receive, an indication of the second user action. The style engine may receive the indication of the second user action using a second code snippet included in the website. For example, the second code snippet may include executable code that calls an API function to report user actions. Accordingly, the indication of the second user action may be an argument (e.g., at least one argument) in a call to the API function. The code comprising the website therefore includes an indication of the API function (e.g., an IP address or another type of endpoint associated with the API function, a name of the API functions, and/or an indication of an argument accepted by the API function, among other examples). Because the indication of the second user action may be transmitted directly to the style engine, power, processing resources, and network overhead are conserved that otherwise would have been consumed in transmitting the indication through multiple parties.

In some implementations, the second code snippet is included in an HTML file of the website. Alternatively, the second code snippet may be included in a script (e.g., a JavaScript file), and an HTML file of the website may link to the script.

Although the example 100 is described in connection with the user device transmitting the indication of the second user action directly to the style engine, other examples may include the user device transmitting the indication of the second user action to the website host, and the website host transmitting the indication of the second user action to the style engine (e.g., forwarding the indication to the style engine or re-packaging the indication into a new message that is transmitted to the style engine). As a result, the API function indicated by the second code snippet may be associated with the website host, which is less likely to trigger a security alert from the user device (e.g., from a web browser and/or an anti-malware application executed by the user device) as compared with the API function being associated with the style engine. In some implementations, some user actions may be reported directly to the style engine while other user actions may be reported via the website host. For example, code snippets associated with a first set of user actions may indicate a first set of APIs that are associated with the style engine while code snippets associated with a second set of user actions may indicate a second set of APIs that are associated with the website host.

As shown by reference number 145, the style engine may apply a machine learning model (e.g., as described in connection with FIGS. 3A-3B) to generate a recommended modification to a second style, associated with a second element on the website, based on the indication of the second user action. The machine learning model may be stored locally (e.g., in a memory controlled by the style engine) or at least partially remotely from the style engine (e.g., physically, logically, and/or virtually). Accordingly, the style engine may transmit a query (e.g., an HTTP request and/or an API call including an indication of the second user action) to a device storing the machine learning model and receive a response (e.g., an HTTP response and/or a return from the API call) indicating the recommended modification.

As shown by reference number 150a, the style engine may transmit, and the user device may receive, an instruction to modify the second style (e.g., according to the recommended modification). For example, the instruction may include an indication of a new CSS selector (associated with the second element) to replace an old CSS selector (associated with the second element).

In some implementations, the style engine may transmit the instruction in response to an API call from the user device triggered by the second code snippet. Accordingly, the user device may change how the website is output to the user consistent with the instruction to modify the second style. For example, a web browser executed by the user device may modify the second style in response to the instruction. Because the instruction may be transmitted directly to the user device, power, processing resources, and network overhead are conserved that otherwise would have been consumed in transmitting the instruction through multiple parties.

Additionally, or alternatively, and as shown by reference number 150b, the style engine may transmit, and the website host may receive, the instruction to modify the second style. For example, the style engine may transmit the instruction to the website host in response to the indication of the second user action. Accordingly, the website host may transmit, and the user device may receive, an update to the code comprising the website based on the instruction to modify the second style. As a result, the second style is changed in response to a communication from the website host, which is less likely to trigger a security alert from the user device (e.g., from a web browser and/or an anti-malware application executed by the user device) as compared with the user device receiving a communication directly from the style engine.

Because the instruction to modify the second style is omitted from the code comprising the website, the website host consumed less power, fewer processing resources, and less network overhead in transmitting the code to the user device. Additionally, the user device consumed less power, less memory overhead in storing the code (e.g., temporarily for a web browser), and fewer processing resources in receiving the code from the website host (e.g., re-assembling packets from the website host).

Although the example 100 is described in connection with the machine learning model generating the recommended modification in response to the indication of the second user action, other examples may additionally or alternatively include the machine learning model generating recommended modifications before user actions occur. For example, the machine learning model may generate a recommended modification for when a user's scrolling speed satisfies a speed threshold, and the style engine may transmit an instruction to apply the recommended modification at a later time in response to an indication of a scrolling speed that satisfies the speed threshold.

In some implementations, as described in connection with FIGS. 1B and 1C, some user actions may be queried against a data structure while other user actions may be input to a machine learning model. For example, code snippets associated with a first set of user actions may indicate a first set of APIs, and the style engine may process indications from the first set of APIs against the data structure. On the other hand, code snippets associated with a second set of user actions may indicate a second set of APIs, and the style engine may process indications from the second set of APIs using the machine learning model. Additionally, or alternatively, the style engine may identify indications associated with the first set of user actions and determine to use the data structure on the indications associated with the first set of user actions. On the other hand, the style engine may identify indications associated with the second set of user actions and determine to use the machine learning model on the indications associated with the second set of user actions.

In some implementations, the style engine may additionally store the indication of the first user action and the indication of the second user action remotely from the user device accessing the website. For example, the indication of the first user action and the indication of the second user action may be used for training (or re-training) the machine learning model (e.g., as described in connection with FIG. 3A). Because the indications are stored remotely, memory overhead at the user device is reduced as compared with cookies and other types of trackers that are stored locally on the user device.

The style engine may additionally refrain from providing a third-party server access to the indication of the first user action and the indication of the second user action. As a result, the style engine increases security for the user as compared with third-party cookies that are shared with third-party servers (e.g., that manage other websites). Additionally, the style engine is less likely to trigger a security alert from the user device (e.g., from a web browser and/or an anti-malware application executed by the user device) as compared with using third-party cookies.

Figure 1D:
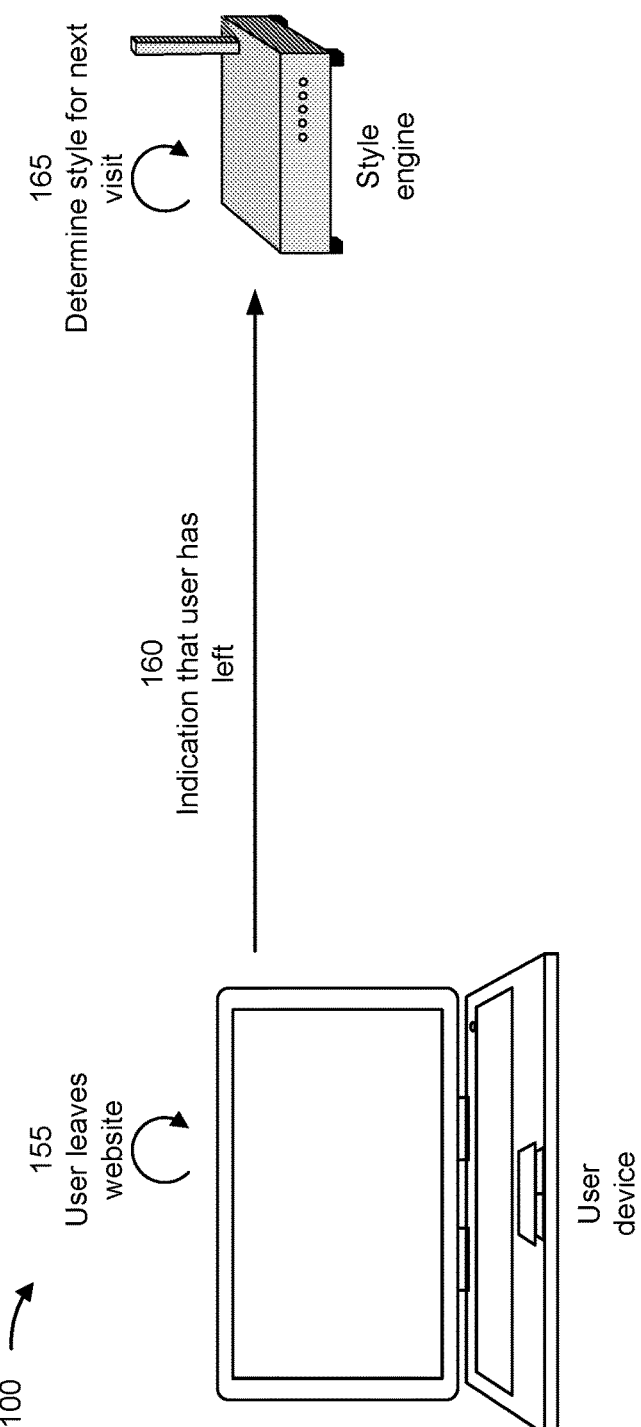

As shown in FIG. 1D and by reference number 155, the user may leave the website. For example, the user may close a tab associated with the website and provisioned by a web browser executed by the user device. In another example, the user may leave the tab open but sleeping (or otherwise not updating). As shown by reference number 160, the user device may transmit, and the style engine may receive, an indication that the user has left. For example, a code snippet may trigger the indication to be transmitted, similarly as described in connection with FIG. 1B and FIG. 1C. Although the example 100 is described in connection with the user device transmitting the indication that the user has left directly to the style engine, other examples may include the user device transmitting the indication that the user has left to the website host, and the website host transmitting the indication that the user has left to the style engine (e.g., forwarding the indication to the style engine or re-packaging the indication into a new message that is transmitted to the style engine).

As shown by reference number 165, the style engine may determine a style to apply for a next visit (e.g., when the user returns to the website). In some implementations, the style engine may map the indication of the first user action and the indication of the second user action to the style to apply for the next visit using a data structure. For example, the style engine may apply rules (e.g., one or more rules) encoded in the data structure to determine the style to apply for the next visit based on interactions of the user with the website from a previous visit. Additionally, or alternatively, the style engine may apply a machine learning model (e.g., as described in connection with FIGS. 3A-3B) to generate the style to apply for the next visit based on the indication of the first user action and the indication of the second user action.

Figure 1E:
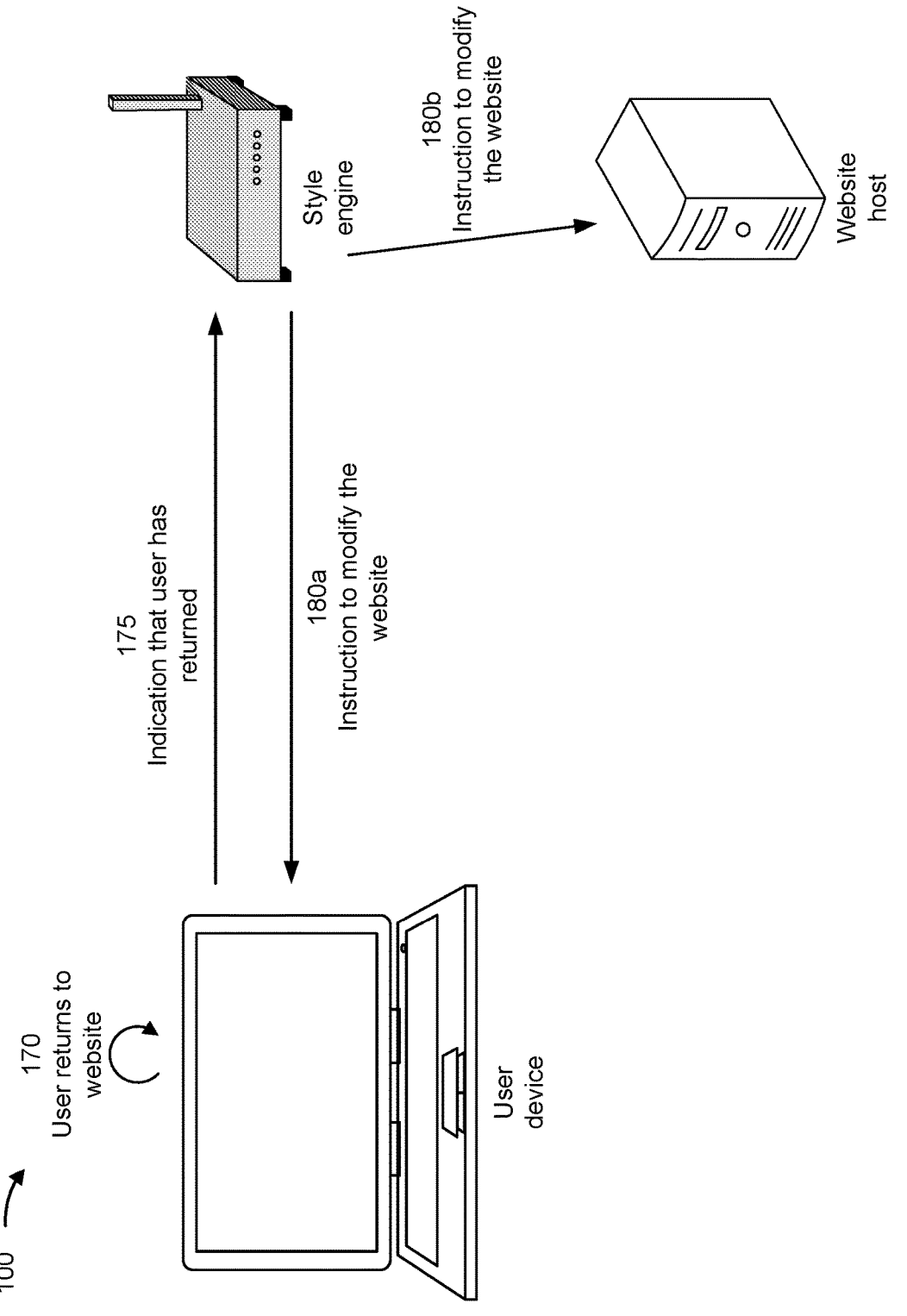

As shown in FIG. 1E and by reference number 170, the user may return to the website. For example, the user may request the website again (e.g., as described in connection with FIG. 1A) using a web browser executed by the user device. In another example, the user may reactivate a tab, associated with the website, was sleeping (or otherwise not updating). As shown by reference number 175, the user device may transmit, and the style engine may receive, an indication that the user has returned. For example, a code snippet may trigger the indication to be transmitted, similarly as described in connection with FIG. 1B and FIG. 1C. In some implementations, the style engine may determine that the user has returned (and is not a new user) based on a machine name, a medium access control (MAC) address, an IP address, and/or another type of identifier associated with the user. Although the example 100 is described in connection with the user device transmitting the indication that the user has returned directly to the style engine, other examples may include the user device transmitting the indication that the user has returned to the website host, and the website host transmitting the indication that the user has returned to the style engine (e.g., forwarding the indication to the style engine or re-packaging the indication into a new message that is transmitted to the style engine).

As shown by reference number 180a, the style engine may transmit, and the user device may receive, an instruction to modify a portion of the website (e.g., according to the style to apply for the next visit). For example, the instruction may include an indication of a new CSS selector to replace an old CSS selector. Additionally, or alternatively, the instruction may include an indication of new content (e.g., new text and/or multimedia) to replace old content (e.g., old text and/or multimedia). The style engine may thus modify the website, based on the user leaving and returning, without updating the code comprising the website.

In some implementations, the style engine may transmit the instruction in response to the indication that the user has returned. Accordingly, the user device may change how the website is output to the user consistent with the instruction to modify the portion of the website. For example, a web browser executed by the user device may modify the website in response to the instruction. Because the instruction may be transmitted directly to the user device, power, processing resources, and network overhead are conserved that otherwise would have been consumed in transmitting the instruction through multiple parties.

Additionally, or alternatively, and as shown by reference number 180b, the style engine may transmit, and the website host may receive, the instruction to modify the portion of the website. For example, the style engine may transmit the instruction to the website host in response to the indication that the user has returned. Accordingly, the website host may transmit, and the user device may receive, an update to the code comprising the website based on the instruction to modify the portion of the website. As a result, the website is changed in response to a communication from the website host, which is less likely to trigger a security alert from the user device (e.g., from a web browser and/or an anti-malware application executed by the user device) as compared with the user device receiving a communication directly from the style engine.

By using techniques as described in connection with FIGS. 1A-1E, code snippets may indicate, to the style guide, user actions with the website, and the style guide may transmit instructions to modify styles of the website in response. Because the instructions from the style engine are omitted from the code comprising the website, network overhead is conserved as compared with when style modifications are hard-coded into the code comprising the website. Additionally, the website host and the user device conserve power and processing resources because the code comprising the website is smaller as compared with when style modifications are hard-coded into the code comprising the website. Furthermore, the style engine may apply the machine learning model to generate recommended modifications without updating the code comprising the website; as a result, power and processing resources are conserved that otherwise would have been expended on updating the code, comprising the website, at the website host.

As indicated above, FIGS. 1A-1E are provided as an example. Other examples may differ from what is described with regard to FIGS. 1A-1E.

FIGS. 2A-2C are diagrams of an example sequence 200 of website element style changes. The example sequence 200 may be implemented at a user device based on instructions from a style engine. These devices are described in more detail in connection with FIGS. 4 and 5.

As shown in FIG. 2A, the example sequence 200 may begin with a user viewing (or, for a visually impaired user, listening to) a website (e.g., using a web browser executed by the user device). While the website is viewed, links in a header 205 and/or links in a body 210 may appear without underlining and/or without distinguishing colors (e.g., appearing black rather than blue). Additionally, a button 215 may be recessed (or otherwise non-descript), and a picture 220 may have no captioning. On the other hand, text in the body 210 may appear larger and/or with bolding. These style modifications may be performed by the style engine in response to an indication that the user is viewing the website (e.g., from a code snippet, as described in connection with FIG. 1B and FIG. 1C).

As shown in FIG. 2B, the user begins scrolling (e.g., using the web browser executed by the user device). While the website is scrolled, the links in the header 205 and/or the links in the body 210 may appear with underlining and/or with distinguishing colors (e.g., appearing blue rather than black). Additionally, the button 215 may be raised (or otherwise distinctive), and the picture 220 may appear with a caption. On the other hand, the text in the body 210 may appear smaller and/or without bolding. These style modifications may be performed by the style engine in response to an indication that the user is scrolling the website (e.g., from a code snippet, as described in connection with FIG. 1B and FIG. 1C).

As shown in FIG. 2C, a speed of the scrolling increases (e.g., such that the speed satisfies a speed threshold). During faster scrolling, the links in the header 205, the links in the body 210, and/or the button 215 may appear larger and/or with bolding. Additionally, the picture 220 may be replaced with a button 225. On the other hand, the text in the body 210 may appear smaller and/or without bolding. These style modifications may be performed by the style engine in response to an indication of the speed of the scrolling (e.g., from a code snippet, as described in connection with FIG. 1B and FIG. 1C).

As indicated above, FIGS. 2A-2C are provided as an example. Other examples may differ from what is described with regard to FIGS. 2A-2C. For example, additional user actions may trigger style changes, as described in connection with FIG. 1B and FIG. 1C. Additionally, or alternatively, additional style changes may be applied, as described in connection with FIG. 1B and FIG. 1C.

Figure 3A:
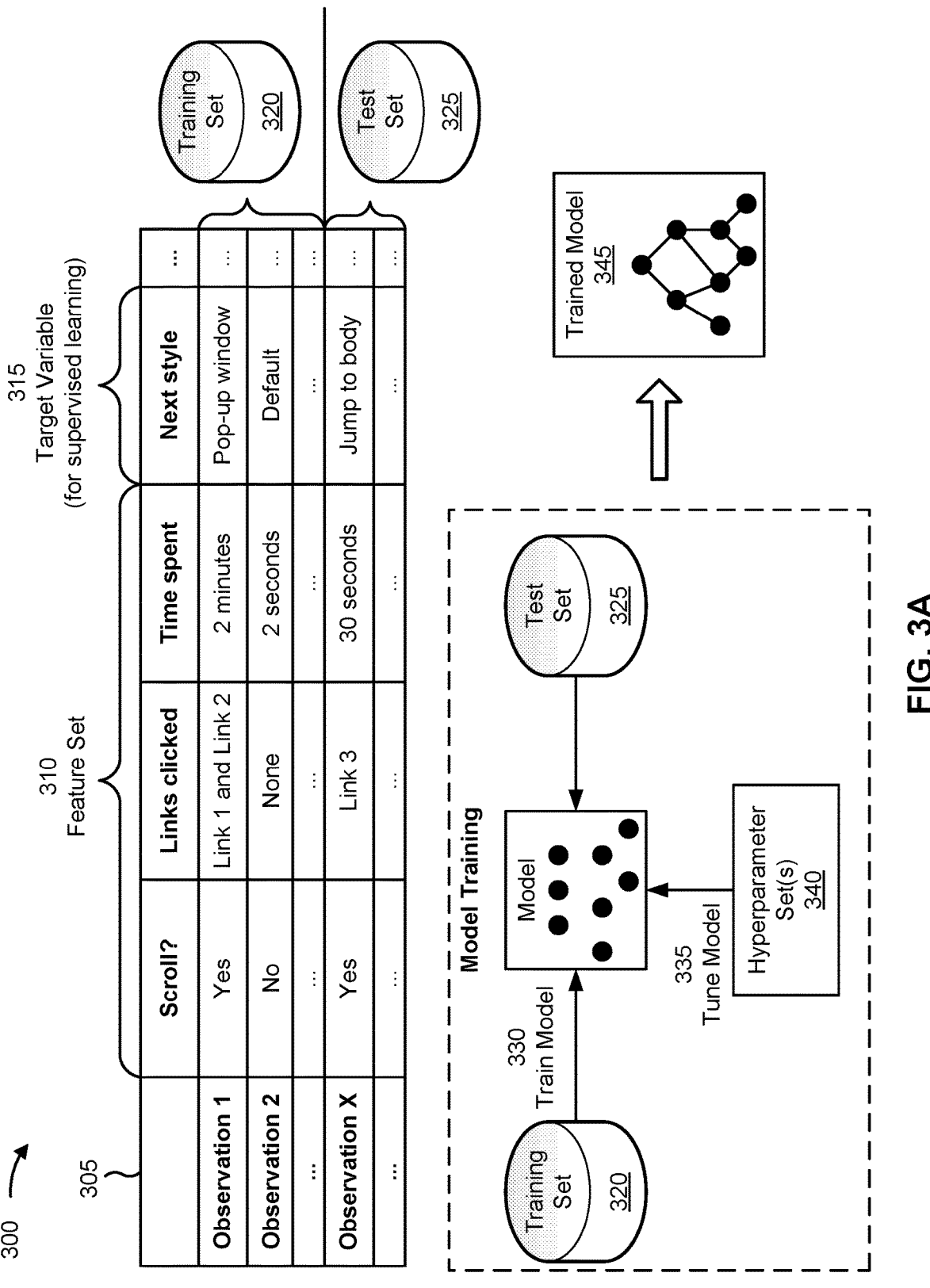
FIGS. 3A-3B are diagrams illustrating an example of training and using a machine learning model, in accordance with some embodiments of the present disclosure.
Figure 3B:
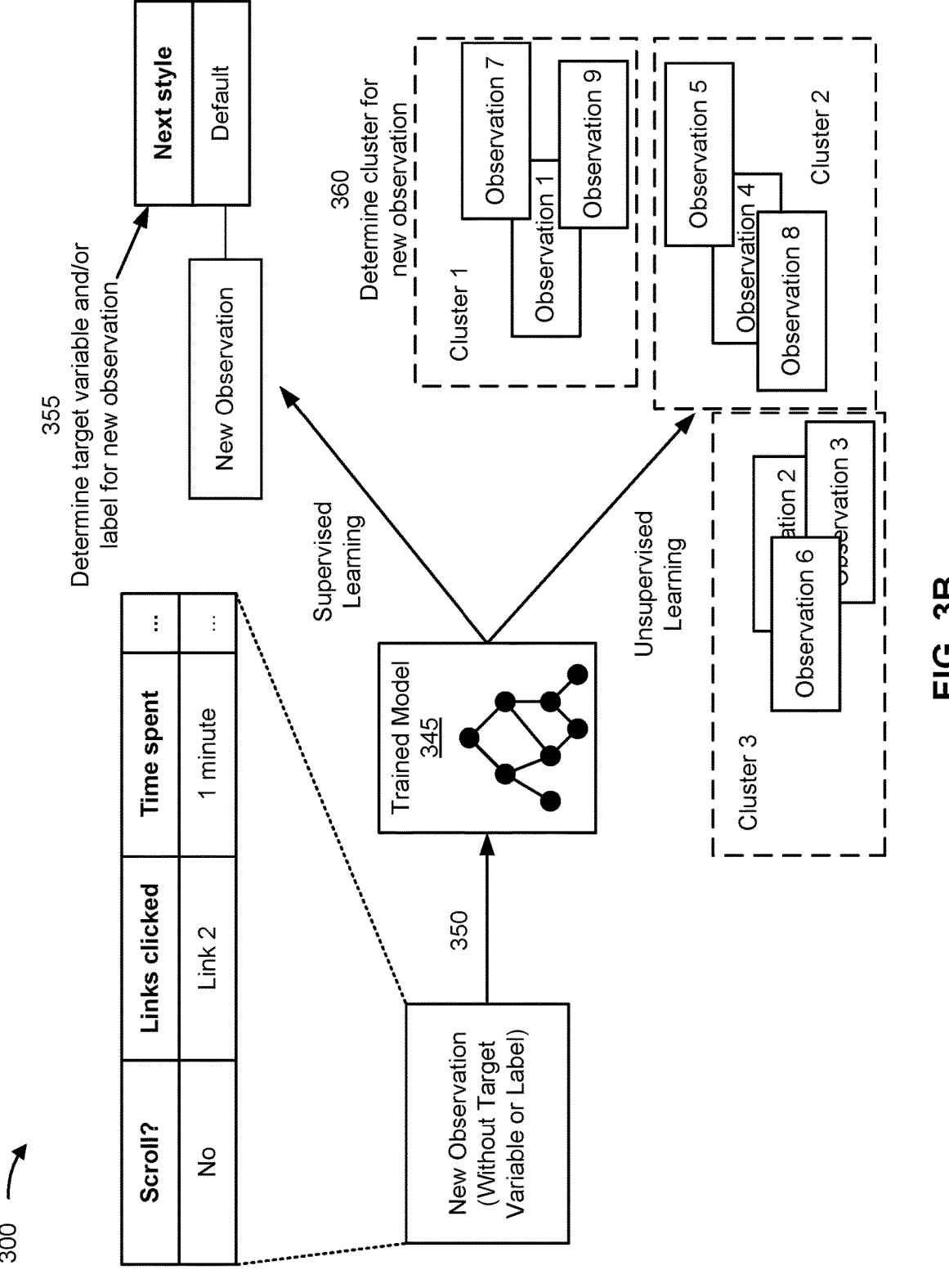

FIGS. 3A-3B are diagrams illustrating an example 300 of training and using a machine learning model in connection with modifying website element styles based on user interaction. The machine learning model training described herein may be performed using a machine learning system. The machine learning system may include or may be included in a computing device, a server, a cloud computing environment, or the like, such as style engine described herein.

As shown by reference number 305, a machine learning model may be trained using a set of observations. The set of observations may be obtained and/or input from training data (e.g., historical data), such as data gathered during one or more processes described herein. For example, the set of observations may include data gathered from the style engine, as described herein. In some implementations, the machine learning system may receive the set of observations (e.g., as input) from user devices.

As shown by reference number 310, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from user devices. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of whether a user scrolled, a second feature of which links the user clicked, a third feature of how much time the user spent, and so on. As shown, for a first observation, the first feature may have a value of Yes, the second feature may have a value of Links 1 and 2, the third feature may have a value of 2 minutes, and so on. These features and feature values are provided as examples, and may differ in other examples. For example, the feature set may include one or more of the following features: an average speed of the user's scrolling, which images or videos the user viewed, whether the user copy-and-pasted anything, or whether the user interacted with an ad, among other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 315, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 300, the target variable is a next style to apply, which has a value of Pop-up window for the first observation. Therefore, the next style may apply when the user returns (e.g., as described in connection with FIG. 1E).

The feature set and target variable described above are provided as examples, and other examples may differ from what is described above. For example, the target variable may include a style modification to apply. Therefore, the style modification may apply in response to a user action (e.g., as described in connection with FIG. 1C).

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 320 that may include a first subset of observations, of the set of observations, and a test set 325 that may include a second subset of observations of the set of observations. The training set 320 may be used to train (e.g., fit or tune) the machine learning model, while the test set 325 may be used to evaluate a machine learning model that is trained using the training set 320. For example, for supervised learning, the test set 325 may be used for initial model training using the first subset of observations, and the test set 325 may be used to test whether the trained model accurately predicts target variables in the second subset of observations. In some implementations, the machine learning system may partition the set of observations into the training set 320 and the test set 325 by including a first portion or a first percentage of the set of observations in the training set 320 (e.g., 75%, 80%, or 85%, among other examples) and including a second portion or a second percentage of the set of observations in the test set 325 (e.g., 25%, 20%, or 15%, among other examples). In some implementations, the machine learning system may randomly select observations to be included in the training set 320 and/or the test set 325.

As shown by reference number 330, the machine learning system may train a machine learning model using the training set 320. This training may include executing, by the machine learning system, a machine learning algorithm to determine a set of model parameters based on the training set 320. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 320). For example, for a regression algorithm, a model parameter may include a regression coefficient (e.g., a weight). For a decision tree algorithm, a model parameter may include a decision tree split location, as an example.

As shown by reference number 335, the machine learning system may use one or more hyperparameter sets 340 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm may include a strength (e.g., a weight) of a penalty applied to a regression coefficient to mitigate overfitting of the machine learning model to the training set 320. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 320. The machine learning system may tune each machine learning algorithm using one or more hyperparameter sets 340 (e.g., based on operator input that identifies hyperparameter sets 340 to be used and/or based on randomly generating hyperparameter values). The machine learning system may train a particular machine learning model using a specific machine learning algorithm and a corresponding hyperparameter set 340. In some implementations, the machine learning system may train multiple machine learning models to generate a set of model parameters for each machine learning model, where each machine learning model corresponds to a different combination of a machine learning algorithm and a hyperparameter set 340 for that machine learning algorithm.

In some implementations, the machine learning system may perform cross-validation when training a machine learning model. Cross validation can be used to obtain a reliable estimate of machine learning model performance using only the training set 320, and without using the test set 325, such as by splitting the training set 320 into a number of groups (e.g., based on operator input that identifies the number of groups and/or based on randomly selecting a number of groups) and using those groups to estimate model performance. For example, using k-fold cross-validation, observations in the training set 320 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k-1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 340 associated with a particular machine learning algorithm. The machine learning system may compare the overall cross-validation scores for different hyperparameter sets 340 associated with the particular machine learning algorithm, and may select the hyperparameter set 340 with the best (e.g., highest accuracy, lowest error, or closest to a desired threshold) overall cross-validation score for training the machine learning model. The machine learning system may then train the machine learning model using the selected hyperparameter set 340, without cross-validation (e.g., using all of data in the training set 320 without any hold-out groups), to generate a single machine learning model for a particular machine learning algorithm. The machine learning system may then test this machine learning model using the test set 325 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 345 to be used to analyze new observations, as described below in connection with FIG. 3B.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 320 (e.g., without cross-validation), and may test each machine learning model using the test set 325 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 345.

FIG. 3B illustrates applying the trained machine learning model 345 to a new observation. As shown by reference number 350, the machine learning system may receive a new observation (or a set of new observations), and may input the new observation to the machine learning model 345. As shown, the new observation may include a first feature of No, a second feature of Link 2, a third feature of 1 minute, and so on, as an example. The machine learning system may apply the trained machine learning model 345 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 345 may predict a value of Default for the target variable of next style to apply for the new observation, as shown by reference number 355. Based on this prediction (e.g., based on the value having a particular label or classification or based on the value satisfying or failing to satisfy a threshold), the machine learning system may provide a recommendation and/or output for determination of a recommendation, such as an indication of a CSS style name corresponding to the Default style. Additionally, or alternatively, the machine learning system may perform an automated action and/or may cause an automated action to be performed (e.g., by instructing another device to perform the automated action), such as transmitting an instruction to apply the Default style (e.g., as described in connection with FIG. 1E). As another example, if the machine learning system were to predict a value of Jump to body for the target variable of next style to apply, then the machine learning system may provide a different recommendation (e.g., an indication of an HTML command to jump to the body of a website) and/or may perform or cause performance of a different automated action (e.g., transmitting an instruction to incorporate, into a website, an HTML command to jump to the body of the website). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 345 may classify (e.g., cluster) the new observation in a cluster, as shown by reference number 360. The observations within a cluster may have a threshold degree of similarity. As an example, if the machine learning system classifies the new observation in a first cluster (e.g., user actions associated with interest in text), then the machine learning system may provide a first recommendation, such as an indication of a CSS style with increased text size. Additionally, or alternatively, the machine learning system may perform a first automated action and/or may cause a first automated action to be performed (e.g., by instructing another device to perform the automated action) based on classifying the new observation in the first cluster, such as transmitting an instruction to apply a style with increased text size. As another example, if the machine learning system were to classify the new observation in a second cluster (e.g., user actions associated with interest in multimedia), then the machine learning system may provide a second (e.g., different) recommendation (e.g., an indication of a CSS style with image captions) and/or may perform or cause performance of a second (e.g., different) automated action, such as transmitting an instruction to apply a style with image captions.

In this way, the machine learning system may apply a rigorous and automated process to modifying website styles. The machine learning system may enable recognition and/or identification of tens, hundreds, thousands, or millions of features and/or feature values for tens, hundreds, thousands, or millions of observations, thereby increasing accuracy and consistency and reducing delay associated with modifying website styles relative to requiring computing resources to be allocated for tens, hundreds, or thousands of operators to manually modify website styles, by changing code of the website, based on the features or feature values.

As indicated above, FIGS. 3A-3B are provided as an example. Other examples may differ from what is described in connection with FIGS. 3A-3B. For example, the machine learning model may be trained using a different process than what is described in connection with FIG. 3A. Additionally, or alternatively, the machine learning model may employ a different machine learning algorithm than what is described in connection with FIGS. 3A-3B, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 4:
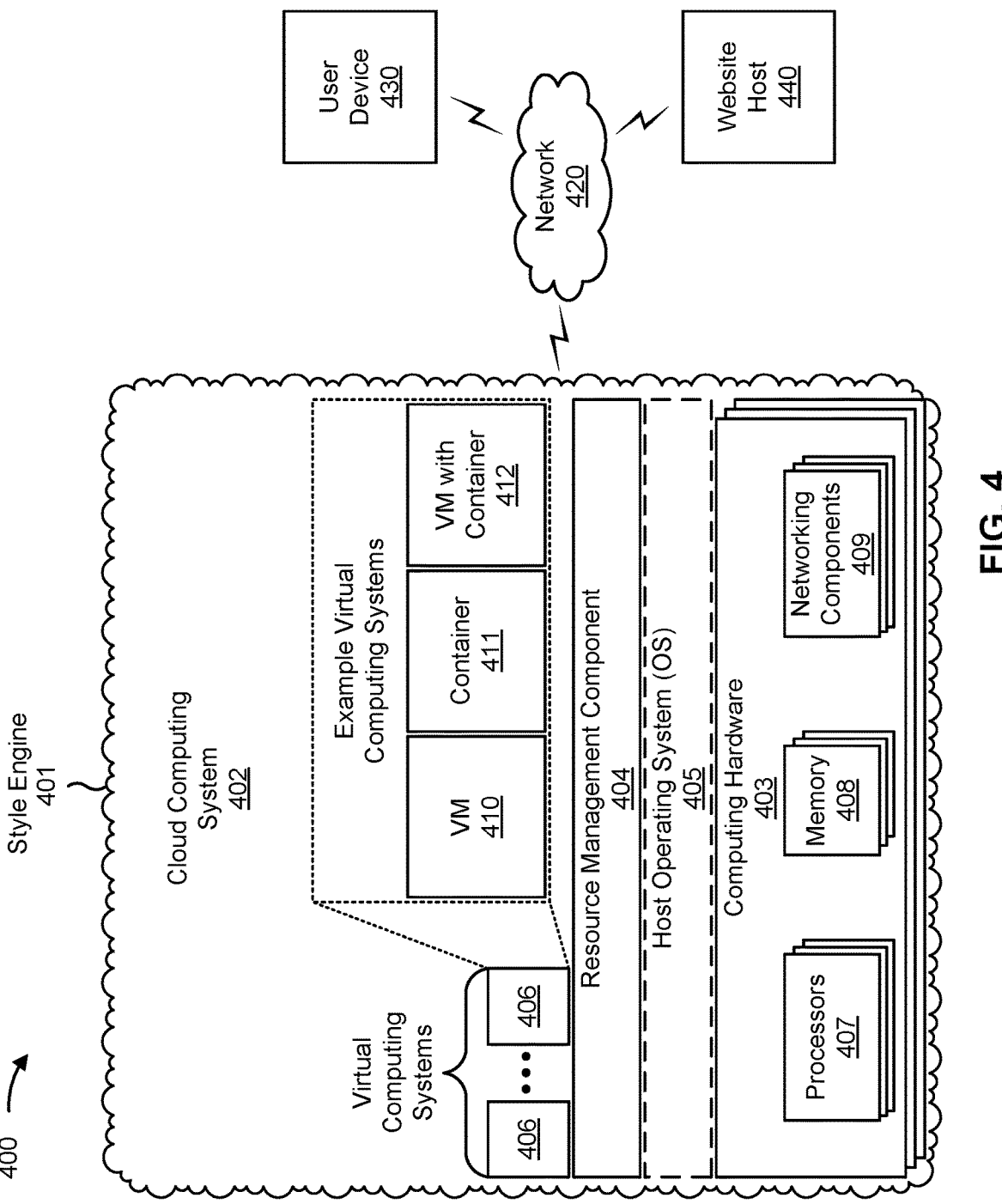
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include a style engine 401, which may include one or more elements of and/or may execute within a cloud computing system 402. The cloud computing system 402 may include one or more elements 403-412, as described in more detail below. As further shown in FIG. 4, environment 400 may include a network 420, a user device 430 and/or a website host 440. Devices and/or elements of environment 400 may interconnect via wired connections and/or wireless connections.

The cloud computing system 402 may include computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

The computing hardware 403 may include hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 may include a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 410. Additionally, or alternatively, the resource management component 404 may include a container manager, such as when the virtual computing systems 406 are containers 411. In some implementations, the resource management component 404 executes within and/or in coordination with a host operating system 405.

A virtual computing system 406 may include a virtual environment that enables cloud-based execution of operations and/or processes described herein using computing hardware 403. As shown, a virtual computing system 406 may include a virtual machine 410, a container 411, or a hybrid environment 412 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the style engine 401 may include one or more elements 403-412 of the cloud computing system 402, may execute within the cloud computing system 402, and/or may be hosted within the cloud computing system 402, in some implementations, the style engine 401 may not be cloud-based (e.g., may be implemented outside of a cloud computing system) or may be partially cloud-based. For example, the style engine 401 may include one or more devices that are not part of the cloud computing system 402, such as device 500 of FIG. 5, which may include a stand-alone server or another type of computing device. The style engine 401 may perform one or more operations and/or processes described in more detail elsewhere herein.

The network 420 may include one or more wired and/or wireless networks. For example, the network 420 may include a cellular network, a public land mobile network (PLMN), a local area network (LAN), a wide area network (WAN), a private network, the Internet, and/or a combination of these or other types of networks. The network 420 enables communication among the devices of the environment 400.

The user device 430 may include one or more devices capable of receiving, generating, storing, processing, and/or providing information associated with websites, as described elsewhere herein. The user device 430 may include a communication device and/or a computing device. For example, the user device 430 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 430 may communicate with one or more other devices of environment 400, as described elsewhere herein.

The website host 440 may include one or more devices capable of receiving, generating, storing, processing, and/or providing information associated with websites, as described elsewhere herein. The website host 440 may include a communication device and/or a computing device. For example, the website host 440 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The website host 440 may communicate with one or more other devices of environment 400, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
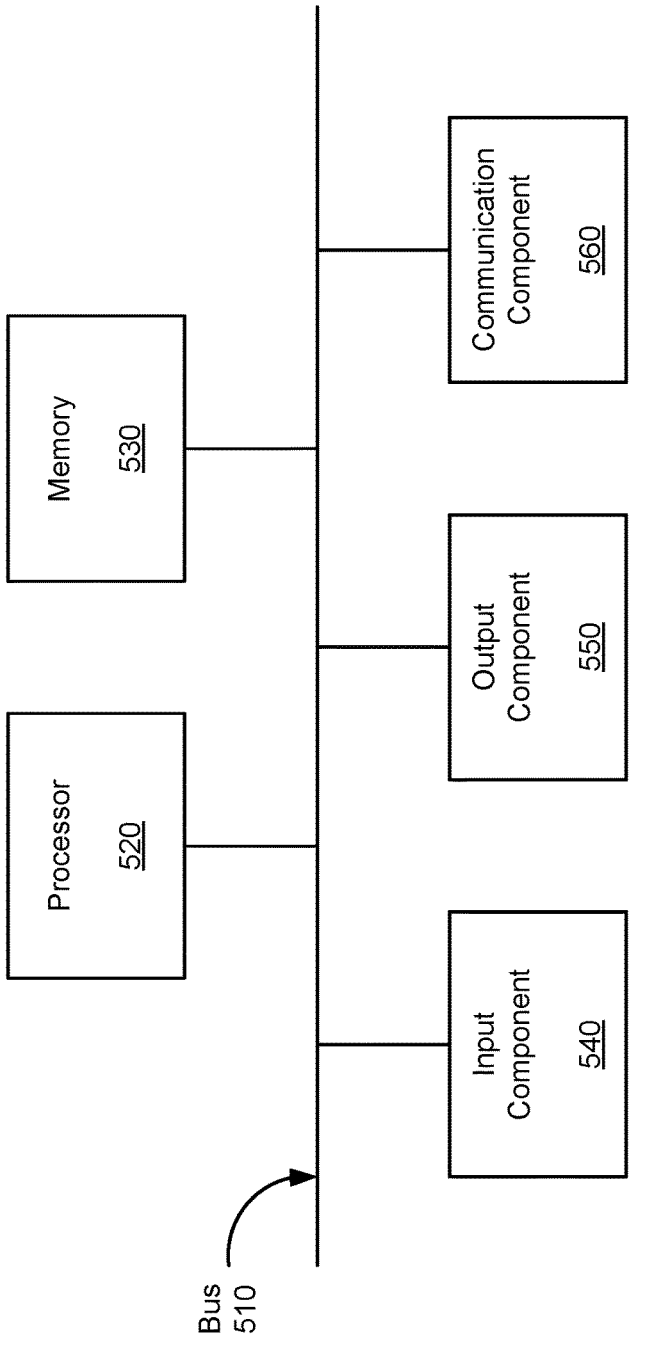
FIG. 5 is a diagram of example components of one or more devices of FIG. 4, in accordance with some embodiments of the present disclosure.

FIG. 5 is a diagram of example components of a device 500 associated with modifying website element styles based on user interaction. The device 500 may correspond to a user device 430 and/or a website host 440. In some implementations, the user device 430 and/or the website host 440 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hard-wired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

FIG. 6 is a flowchart of an example process 600 associated with modifying website element styles based on user interaction. In some implementations, one or more process blocks of FIG. 6 may be performed by the style engine 401. In some implementations, one or more process blocks of FIG. 6 may be performed by another device or a group of devices separate from or including the style engine 401, such as the user device 430 and/or the website host 440. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving, using a first code snippet included in a website, an indication of a first user action (block 610). For example, the style engine 401 (e.g., using processor 520, memory 530, input component 540, and/or communication component 560) may receive, using a first code snippet included in a website, an indication of a first user action, as described above in connection with reference number 120 of FIG. 1B. As an example, the first code snippet may include executable code that calls an API function to report user actions, such that the indication of the first user action may be at least one argument in a call to the API function.

As further shown in FIG. 6, process 600 may include transmitting an instruction to modify a style, associated with a first element on the website, based on the indication of the first user action (block 620). For example, the style engine 401 (e.g., using processor 520, memory 530, and/or communication component 560) may transmit an instruction to modify a style, associated with a first element on the website, based on the indication of the first user action, as described above in connection with reference number 130a and/or reference number 130b of FIG. 1B. As an example, the style engine 401 may transmit, and a user device may receive, the instruction to modify the style associated with the first element. Additionally, or alternatively, the style engine 401 may transmit, and a website host may receive, the instruction to modify the style associated with the first element. The style engine 401 may transmit the instruction in response to an API call triggered by the first code snippet.

As further shown in FIG. 6, process 600 may include receiving, using a second code snippet included in the website, an indication of a second user action (block 630). For example, the style engine 401 (e.g., using processor 520, memory 530, input component 540, and/or communication component 560) may receive, using a second code snippet included in the website, an indication of a second user action, as described above in connection with reference number 140 of FIG. 1C. As an example, the second code snippet may include executable code that calls an API function to report user actions, such that the indication of the second user action may be at least one argument in a call to the API function.

As further shown in FIG. 6, process 600 may include transmitting an instruction to modify a style, associated with a second element on the website, based on the indication of the second user action (block 640). For example, the style engine 401 (e.g., using processor 520, memory 530, and/or communication component 560) may transmit an instruction to modify a style, associated with a second element on the website, based on the indication of the second user action, as described above in connection with reference number 150a and/or reference number 150b of FIG. 1C. As an example, the style engine 401 may transmit, and a user device may receive, the instruction to modify the style associated with the second element. Additionally, or alternatively, the style engine 401 may transmit, and a website host may receive, the instruction to modify the style associated with the second element. The style engine 401 may transmit the instruction in response to an API call triggered by the second code snippet.

As further shown in FIG. 6, process 600 may include applying a machine learning model to the first user action and the second user action (block 650). For example, the style engine 401 (e.g., using processor 520 and/or memory 530) may apply a machine learning model to the first user action and the second user action, as described above in connection with reference number 145 of FIG. 1C. As an example, the style engine may apply the machine learning model as described in connection with FIGS. 2A-2B to generate a recommended modification to a portion of the website.

As further shown in FIG. 6, process 600 may include transmitting an instruction to modify a portion of the website based on output from the machine learning model (block 660). For example, the style engine 401 (e.g., using processor 520, memory 530, and/or communication component 560) may transmit an instruction to modify a portion of the website based on output from the machine learning model, as described above in connection with reference number 180a and/or reference number 180b of FIG. 1E. As an example, the style engine 401 may transmit, and a user device may receive, the instruction to modify the portion of the website. Additionally, or alternatively, the style engine 401 may transmit, and a website host may receive, the instruction to modify the portion of the website. The style engine 401 may transmit the instruction in response to an indication of a user action. In some implementations, the style engine 401 may transmit the instruction in response to an indication that the user has returned to the website.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1E, 2A-2C, and/or 3A-3B. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A system for automatically modifying website element styles, the system comprising:
    one or more memories; and
    one or more processors, coupled to the one or more memories, configured to:
        receive, from a user device and at a style engine that is remote from the user device and remote from a website host of a website, an indication of a first user action using a first code snippet included in the website;

transmit, from the style engine to the user device, an instruction to modify a first style, associated with a first element on the website, based on the indication of the first user action, wherein the instruction to modify the first style comprises an indication of a new cascading style sheet (CSS) selector to replace an old CSS selector;

receive, from the user device and at the style engine, an indication of a second user action using a second code snippet included in the website;

transmit, from the style engine to the user device, an instruction to modify a second style, associated with a second element on the website, based on the indication of the second user action;

identify the first user action as belonging to a first set of user actions associated with a data structure;

identify the second user action as belonging to a second set of user actions associated with a machine learning model;

use the data structure in connection with the first user action;

apply the machine learning model to generate a recommended modification to the second style based on the indication of the second user action; and transmit an instruction to modify a portion of the website based on output from the machine learning model.

2. The system of claim 1, wherein the one or more processors are configured to:

receive an indication that a user has returned to the website, wherein the instruction to modify the portion of the website is transmitted in response to the indication that the user has returned.

3. The system of claim 1, wherein the first element comprises a hyperlink, a button, a text box, or an image.

4. The system of claim 1, wherein the second element comprises text.

5. The system of claim 1, wherein the first user action comprises scrolling or hovering.

6. The system of claim 1, wherein the second user action comprises viewing.

7. The system of claim 1, wherein the one or more processors are further configured to:

receive an indication that a user of the user device has left the website;

determine a style to apply when the user returns to the website;

receive an indication that the user has returned to the website; and transmit, to the user device, an instruction to modify a portion of the website in accordance with the determined style and based on the indication that the user has returned to the website.

8. The system of claim 1, wherein the data structure comprises a table mapping user actions to instructions to modify styles.

9. A method of automatically modifying website element styles, comprising:

receiving, from a user device and at a style engine that is remote from the user device and remote from a website host of a website, an indication of a first user action using a first code snippet included in the website;

transmitting, from the style engine to the user device, an instruction to modify a first style, associated with a first element on the website, based on the indication of the first user action, wherein the instruction to modify the first style comprises an indication of a new cascading style sheet (CSS) selector to replace an old CSS selector;

receiving, from the user device and at the style engine, an indication of a second user action using a second code snippet included in the website;

transmitting, from the style engine to the user device, an instruction to modify a second style, associated with a second element on the website, based on the indication of the second user action;

identifying the first user action as associated with a data structure and the second user action as associated with a machine learning model;

applying the machine learning model to the second user action to generate a recommended modification to the second style; and transmitting, from the style engine to the user device, an instruction to modify the second style based on the recommended modification generated by the machine learning model.

10. The method of claim 9, wherein the first code snippet comprises executable code that calls an application programming interface (API) function to report user actions.

11. The method of claim 10, wherein code comprising the website includes an indication of the API function.

12. The method of claim 9, wherein the data structure comprises a table mapping the first user action to the instruction to modify the first style.

13. The method of claim 9, further comprising:

applying the machine learning model to the indication of the second user action, wherein the instruction to modify the second style is determined based on output from the machine learning model.

14. The method of claim 9, further comprising:

storing the indication of the first user action and the indication of the second user action remotely from the user device.

15. The method of claim 9, wherein:

the first code snippet is associated with a first set of user actions, associated with a first set of application programming interfaces (APIs), that are queried against the data structure that associates user actions with instructions to modify styles, and the second code snippet is associated with a second set of user actions, associated with a second set of APIs, that are input to the machine learning model.

16. A non-transitory computer-readable medium storing a set of instructions for automatically modifying website element styles, the set of instructions comprising:

one or more instructions that, when executed by one or more processors of a device, cause the device to:

receive, from a user device and at a style engine that is remote from the user device and remote from a website host of a website, an indication of a first user action using a first code snippet included in the website;

receive, from the user device and at the style engine, an indication of a second user action using a second code snippet included in the website;

identify the first user action as associated with a data structure and the second user action as associated with a machine learning model;

use the data structure to determine a modification to a first style in connection with the first user action;

apply the machine learning model to determine a modification to a second style based on the indication of the second user action;

generate, based on output from the data structure and the machine learning model, an instruction to perform a modification to the website, the modification to the website including the modification to the first style and the modification to the second style, wherein the instruction to perform the modification comprises an indication of a new cascading style sheet (CSS) selector to replace an old CSS selector; and transmit, to the user device and from the style engine, the instruction to perform the modification to the website.

17. The non-transitory computer-readable medium of claim 16, wherein the one or more instructions, when executed by the one or more processors, further cause the device to:

receive an indication that a user has returned to the website, wherein the instruction to perform the modification is transmitted in response to the indication that the user has returned.

18. The non-transitory computer-readable medium of claim 16, wherein the one or more instructions, that cause the device to receive the indication of the first user action, cause the device to:

receive an application programming interface (API) call, wherein the indication of the first user action is an argument to the API call.

19. The non-transitory computer-readable medium of claim 16, wherein the one or more instructions, when executed by the one or more processors, further cause the device to:

refrain from providing a third-party server access to the indication of the first user action and the indication of the second user action.

20. The non-transitory computer-readable medium of claim 16, wherein the first code snippet comprises executable code included in a hypertext markup language file of the website.

* * * * *